(12) United States Patent
Guynn

(10) Patent No.: US 9,957,196 B1
(45) Date of Patent: May 1, 2018

(54) PARTICLE SIZE OPTIMIZED WHITE CEMENTITIOUS COMPOSITIONS

(71) Applicant: ROMAN CEMENT, LLC, Salt Lake City, UT (US)

(72) Inventor: John M. Guynn, Salt Lake City, UT (US)

(73) Assignee: ROMAN CEMENT LLC, Salt Lake City, UT (US)

( * ) Notice: Subject to any disclaimer, the term of this patent is extended or adjusted under 35 U.S.C. 154(b) by 0 days. days.

(21) Appl. No.: 15/598,132

(22) Filed: May 17, 2017

Related U.S. Application Data

(60) Provisional application No. 62/451,533, filed on Jan. 27, 2017, provisional application No. 62/337,424, filed on May 17, 2016.

(51) Int. Cl.
| | | |
|---|---|---|
| *C04B 18/14* | (2006.01) | |
| *C04B 28/04* | (2006.01) | |
| *C04B 14/28* | (2006.01) | |
| *C04B 16/06* | (2006.01) | |
| *C04B 24/26* | (2006.01) | |
| *C04B 18/04* | (2006.01) | |
| *C04B 14/06* | (2006.01) | |
| *C04B 14/16* | (2006.01) | |
| *C04B 14/42* | (2006.01) | |
| *C04B 18/08* | (2006.01) | |

(52) U.S. Cl.
CPC ............ *C04B 18/141* (2013.01); *C04B 14/06* (2013.01); *C04B 14/16* (2013.01); *C04B 14/28* (2013.01); *C04B 14/42* (2013.01); *C04B 16/0641* (2013.01); *C04B 18/0481* (2013.01); *C04B 18/08* (2013.01); *C04B 24/26* (2013.01); *C04B 28/04* (2013.01)

(58) Field of Classification Search
CPC ... C04B 18/141; C04B 18/0481; C04B 18/08; C04B 28/04; C04B 14/28; C04B 14/06; C04B 14/16; C04B 14/42; C04B 16/0641; C04B 24/26

See application file for complete search history.

(56) References Cited

U.S. PATENT DOCUMENTS

| | | |
|---|---|---|
| 7,799,128 B2 | 9/2010 | Guynn et al. |
| 7,972,432 B2 | 7/2011 | Guynn et al. |
| 8,323,399 B2 | 12/2012 | Guynn et al. |
| 8,377,201 B2 | 2/2013 | Guynn et al. |
| 8,414,700 B2 | 4/2013 | Guynn et al. |
| 8,551,245 B2 | 10/2013 | Guynn et al. |
| 8,974,593 B2 | 3/2015 | Guynn et al. |
| 9,067,824 B1 | 6/2015 | Hansen et al. |
| 9,102,567 B1 | 8/2015 | Hansen et al. |
| 9,238,591 B2 | 1/2016 | Guynn et al. |
| 9,272,953 B2 | 3/2016 | Guynn et al. |

*Primary Examiner* — Anthony J Green

(74) *Attorney, Agent, or Firm* — Workman Nydegger

(57) ABSTRACT

A cementitious composition includes (i) white Portland cement having a Blaine fineness between about 350 $m^2$/kg and about 550 $m^2$/kg, a D90 between about 11 μm and about 50 μm, and a total combined iron oxide, manganese oxide, and chromium oxide content of less than 1.0% by weight and (ii) a light color ground granulated blast furnace slag (GGBFS) having a Blaine fineness greater than the Blaine fineness of the white Portland cement, a D90 less than the D90 of the white Portland cement, and a total combined iron oxide, manganese oxide, and chromium oxide content of less than 2.0% by weight. The cementitious composition may optionally include at least one of additional SCM, aggregate, fibers, or admixture. The cementitious composition can be a dry blend, a fresh cementitious mixture, or hardened cementitious composition. The cementitious composition can be precast concrete, stucco, GFRC, UHPC or SCC.

24 Claims, No Drawings

PARTICLE SIZE OPTIMIZED WHITE CEMENTITIOUS COMPOSITIONS

CROSS REFERENCE TO RELATED APPLICATIONS

This Application claims the benefit of U.S. Provisional Patent Application No. 62/451,533, filed Jan. 27, 2017, and also U.S. Provisional Patent Application No. 62/337,424, filed May 17, 2016, the disclosures of which are incorporated herein in their entirety.

BACKGROUND

1. Field of the Invention

The invention is in the field of hydraulic cement and cementitious compositions made with hydraulic cement.

2. Technology Review

Modern Portland cement is a ubiquitous building material that when mixed with water forms a flowable or moldable material and then hardens or cures to form a hardened cementitious binding matrix. Portland cement is typically grey in color owing to the inclusion of iron oxide, typically in the form of the clinker mineral tetracalcium aluminoferrite ($C_4AF$), which can act as a flux to bind the other main clinker minerals together (i.e., tricalcium silicate ($C_3S$), dicalcium silicate ($C_2S$), and tricalcium aluminate ($C_3A$)), which typically melt at higher temperature.

White Portland cement (or "white cement") is a specialty cement used when the grey color of grey Portland cement is undesirable. The whiteness of white Portland cement powder is measured by its reflectance value ("L value") and qualifies as "white" when the L value exceeds 85%. Often, the whiteness of cement, limestone and other powders is expressed as "brightness". White cement can be used in combination with white or light colored aggregates to produce white or light concrete for prestige construction projects and decorative work. White, light or other decorative concrete can take the form of pre-cast cladding panels, stucco finishes, or glass fiber reinforced concrete (GFRC) since it is generally not economical to use white cement for purely structural elements. An exception is ultrahigh performance concrete (UHPC) which, by nature is very expensive, and which is often made using white cement for both aesthetics and performance.

White cement has little initial pigmentation and can therefore be used with inorganic pigments to produce colored concretes and mortars or almost any desired color. Grey cement, when used with pigments, produces colors that may be attractive but can also be somewhat dull because of grey background color. With white cement, bright reds, yellows and greens can be readily and more reliably produced. Pigments can be added to the cementitious mixture when mixed. Alternatively, to guarantee repeatable color, some manufacturers supply ready-blended colored cements using white cement as a base.

SUMMARY

Disclosed herein are cementitious compositions comprising dry blends, fresh cementitious mixtures, or hardened cementitious compositions comprised of mixture products of white Portland cement and a light color, relatively high brightness ground granulated blast furnace slag (GGBFS). The cementitious compositions may include other supplementary cementitious materials (SCMs) that are generally white or light colored. The cementitious compositions may also include fibers, admixtures, or other components known in the art of concrete.

A dry blended cementitious composition comprises white Portland cement and a light color GGBFS, and optionally one or more additional components. The white Portland cement and the light color GGBFS are advantageously ground separately, and without intergrinding with each other, in order to control their respective particle size distribution (PSD).

A fresh cementitious mixture comprises water, white Portland cement, and a light color GGBFS, and optionally one or more additional components.

A hardened cementitious composition comprises reaction products of a fresh cementitious mixture comprising water, white Portland cement, and light color GGBFS, and optionally one or more additional components.

DETAILED DESCRIPTION

In some embodiments, a dry blended cement composition comprises:
  a white Portland cement fraction having a Blaine fineness between about 350 $m^2$/kg and about 650 $m^2$/kg, a D90 between about 11 μm and about 50 μm, and a total combined iron oxide, manganese oxide, and chromium oxide content of less than 1.0% by weight;
  a light color ground granulated blast furnace slag fraction having a Blaine fineness greater than the Blaine fineness of the white Portland cement, a D90 less than the D90 of the white Portland cement fraction, and a total combined iron oxide, manganese oxide, and chromium oxide content of less than 2.0% by weight; and
  optionally one or more additional components.

In some embodiments, a fresh cementitious mixture comprises mixture products of:
  water;
  a white Portland cement fraction having a Blaine fineness between about 350 $m^2$/kg and about 650 $m^2$/kg, a D90 between about 11 μm and about 50 μm, and a total combined iron oxide, manganese oxide, and chromium oxide content of less than 1.0% by weight;
  a light color ground granulated blast furnace slag fraction having a Blaine fineness greater than the Blaine fineness of the white Portland cement, a D90 less than the D90 of the white Portland cement fraction, and a total combined iron oxide, manganese oxide, and chromium oxide content of less than 2.0% by weight; and
  optionally one or more additional components.

In some embodiments, a hardened cementitious composition comprises reaction products of:
  water;
  a white Portland cement fraction having a Blaine fineness between about 350 $m^2$/kg and about 650 $m^2$/kg, a D90 between about 11 μm and about 50 μm, and a total combined iron oxide, manganese oxide, and chromium oxide content of less than 1.0% by weight;
  a light color ground granulated blast furnace slag fraction (GGBFS) having a Blaine fineness greater than the Blaine fineness of the white Portland cement, a D90 less than the D90 of the white Portland cement fraction, and a total combined iron oxide, manganese oxide, and chromium oxide content of less than 2.0% by weight; and
  optionally one or more additional components.

In some embodiments, the Blaine fineness of white Portland cement in a dry blended cement composition and/or when initially added to a fresh cementitious mixture is between about 375 m²/kg and about 550 m²/kg, or between about 400 m²/kg and about 500 m²/kg, or between about 425 m²/kg and about 475 m²/kg.

In some embodiments, the D90 of white Portland cement in a dry blended cement composition and/or when initially added to a fresh cementitious mixture is between about 20 μm and about 46 μm, or between about 25 μm and about 42 μm, or between about 30 μm and about 38 μm.

In some embodiments, the white Portland cement in a dry blended cement composition and/or when initially added to a fresh cementitious mixture has a D10 greater than about 1.0 μm, or greater than about 1.2 μm, or greater than about 1.5 μm, or greater than about 1.8 μm, or greater than about 2.2 μm.

In some embodiments, the Blaine fineness of GGBFS in a dry blended cement composition and/or when initially added to a fresh cementitious mixture is between about 400 m²/kg and about 750 m²/kg, or between about 425 m²/kg and about 700 m²/kg, or between about 450 m²/kg and about 650 m²/kg, or between about 500 m²/kg and about 600 m²/kg.

In some embodiments, the D90 of GGBFS in a dry blended cement composition and/or when initially added to a fresh cementitious mixture is between about 5 μm and about 45 μm, or between about 7 μm and about 40 μm, or between about 10 μm and about 35 μm, or between about 12 μm and about 32 μm, or between about 15 μm and about 27 μm.

In some embodiments, the white Portland cement has a total combined transition metal oxide content of less than 1.0% by weight, or less than 0.9% by weight, or less than 0.8% by weight, or less than 0.7% by weight, or less than 0.6% by weight, or less than 0.5% by weight, or less than 0.4% by weight.

In some embodiments, the GGBFS has a total combined transition metal oxide content of less than 2.0% by weight, or less than 1.8% by weight, or less than 1.6% by weight, or less than 1.4% by weight, or less than 1.2% by weight, or less than 1.0% by weight, or less than 0.9% by weight, or less than 0.8% by weight.

In some embodiments, white Portland cement comprises between about 20% and about 80%, or between about 30% and about 70%, or between about 40% and about 60%, or between about 45% and about 55%, by combined weight of white Portland cement and GGBFS.

In some embodiments, GGBFS comprises between about 20% and about 80%, or between about 30% and about 70%, or between about 40% and about 60%, or between about 45% and about 55%, by combined weight of white Portland cement and GGBFS.

In some embodiments, white Portland cement has a reflectance value ("L value") or "brightness" of at least 75%, or at least 80%, or at least 85%, or at least 87%, or at least 88%, or at least 89%, or at least 90%.

In some embodiments, GGBFS has a reflectance value less than the reflectance value of white Portland cement, and that is at least 70%, or at least 72%, or at least 75%, or at least 77%, or at least 80%.

Because of the reduced quantity of white cement and the inclusion of GGBFS, moldings and other cementitious compositions made using the cementitious composition disclosed herein are expected to have lower efflorescence compared to cementitious compositions in which the cementitious binder is purely white cement. Compared to OPC, white cement can have higher alkali content do to the use of fluxes and other reasons. As a result, while white cement can yield moldings that are initially very beautiful, efflorescence can result in long-term degradation of the beauty and structural integrity of moldings made using white cement as sole cementitious binder. The inclusion of GGBFS can significantly reduce or eliminate the incidence of efflorescence, perhaps because of its pozzolanic activity, which can bind and pacify alkali metal salts.

Dry blended cement compositions, fresh cementitious mixtures and/or hardened cementitious compositions may further comprise an additional supplementary cementitious material (SCM). In some embodiments, the additional SCM is white or light colored and has a total combined transition metal oxide content of less than 3.0% by weight, or less than 2.5% by weight, or less than 2.2% by weight, or less than 2.0 by weight, or less than 1.8% by weight, or less than 1.6% by weight, or less than 1.4% by weight, or less than 1.2% by weight, or less than 1.0% by weight, or less than 0.9% by weight, or less than 0.8% by weight.

In some embodiments, the additional SCM is selected from natural pozzolan, ground pumice, metakaolin, ground limestone, ground marble, calcium carbonate, precipitated calcium carbonate (e.g., formed by passing $CO_2$ in flue gas through water comprising calcium ions and alkaline pH), calcined clay, calcine shale, industrial ash, ground glass, and mixtures thereof. In some embodiments, the additional SCM can have a reflectance value ("L value") or brightness of at least 70%, or at least 75%, or at least 80%, or at least 85%, or at least 87%, or at least 88%, or at least 89%, or at least 90%.

In some embodiments, the additional SCM comprises between about 5% and about 70%, or between about 7% and about 60%, or between about 10% and about 50%, or between about 12% and about 40%, by combined weight of white cement, GGBFS, and additional SCM.

In some embodiments, the additional SCM in a dry blended cement composition and/or when initially added to a fresh cementitious mixture has a Blaine fineness less than the Blaine fineness of the white Portland cement, and a D90 greater than the D90 of the white Portland cement. In some embodiments, the D50 and/or the D10 of the additional SCM is greater than the D50 and/or D10 of the white cement.

In some embodiments, the Blaine fineness of the additional SCM in a dry blended cement composition and/or when initially added to a fresh cementitious mixture is between about 50 m²/kg and about 400 m²/kg, or between about 75 m²/kg and about 375 m²/kg, or between about 100 m²/kg and about 350 m²/kg, or between about 125 m²/kg and about 325 m²/kg.

In some embodiments, the D90 of the additional SCM in a dry blended cement composition and/or when initially added to a fresh cementitious mixture is between about 40 μm and about 200 μm, or between about 45 μm and about 170 μm, or between about 50 μm and about 150 μm, or between about 55 μm and about 130 μm, or between about 60 μm and about 120 μm.

In some embodiments, the D10 of the additional SCM in a dry blended cement composition and/or when initially added to a fresh cementitious mixture is between about 1 μm and about 100 μm, or between about 3 μm and about 90 μm, or between about 5 μm and about 80 μm, or between about 8 μm and about 70 μm, or between about 12 μm and about 60 μm.

In order to individually control the particle size distribution (PSD) of each of the various cement, GGBFS and SCM components, they are advantageously produced separately and blended together rather than being interground together.

For example, it may be desirable for the GGBFS to have Blaine fineness greater than and/or a D90 less than that of the white cement component. Because GGBFS is typically harder than white cement clinker, intergrinding the two together yields an interground blend in which the white cement component has higher fineness and lower D90 compared to the fineness and D90 of the GGBFS component, respectively. Grinding white cement clinker and granulated blast furnace slag separately and then blending them together permits control over the respective PSDs of the two components, including ensuring that the GGBFS is finer than and/or has a lower D90 than that of the white cement.

Similarly, SCMs can be softer than white cement and, when interground with white cement clinker, may higher fineness and lower D90 than that of the white cement. For example, where it is desired to include a white limestone powder that is coarser than the white cement, the two materials should be processed separately and then blended together.

In some embodiments, the cementitious compositions comprise a ternary blend of white cement, GGBFS that is finer than the white cement, and a coarse SCM (e.g., limestone powder) that is coarser than the white cement. The use of coarse SCMs is beneficial in order to increase particle packing density of particles in the cement paste, which increases strength, reduces autogenous, plastic and drying shrinkage, and improve cohesiveness and reduce bleeding and segregate. These qualities are beneficial for concrete in general, including precast concrete, stucco, GFRC, UHPC and SCC.

In some embodiments, the cementitious composition further comprises at least one additive to improve chemical balance and strength, such as lime (CaO), dolomite lime (CaO.MgO), hydrated lime (Ca(OH)$_2$), hydrated dolomite lime (Ca(OH)$_2$.Mg(OH)$_2$), calcium sulfate hemihydrate (e.g., plaster of Paris), anhydrous calcium sulfate (e.g., anhydrite), and calcium sulfate dihydrate (e.g., gypsum). Calcium oxides and hydroxides can provide an early source of calcium ions to offset premature calcium depletion caused by pozzolanic reactions. Calcium sulfates can adjust sulfate balance to account for sulfate deficiencies caused by GGBFS and/or optional SCMs.

In some embodiments, the cementitious composition further comprises at least one aggregate selected from fine sand, medium sand, coarse sand, pea gravel, or coarse aggregate. In some embodiments, the at least one aggregate is selected from limestone, marble, dolomite, quartz, quartzite, pumice, shale, and polymers (e.g., post-consumer polystyrene foam beads or fragments).

In some embodiments, the cementitious composition further comprises fibers. Fibers can be used, for example, in high performance concrete. Glass fiber reinforced concrete (GFRC) can include glass fibers to increase fracture energy. In some cases, GFRC is formed by spraying a cementitious mixture onto a surface and permitting it to harden. In some embodiments, precast decorative concrete may include polymer fibers, such as polypropylene, polyvinyl alcohol or nylon fibers, to increase flexural strength and toughness. Ultra-high performance concrete (UHPC) often uses white cement to maintain higher quality, higher strength, and better aesthetics and can include steel fibers for internal reinforcement and to add ductility.

Examples of cementitious compositions within the scope of the disclosure are set forth below. The Examples includes mix designs and tables of comparative strength results. In many cases, cementitious compositions in which more than 50% of the white cement was replaced with GGBFS, and optionally coarse powdered limestone, had similar or greater strength than a standard mix comprising white cement as the only cementitious binder. It is believed that the selection of a white cement, GGBFS having a fineness greater than and/or D90 less than that of the white cement, and one or more strengthening components, such as hydrated lime, limestone powder and/or natural pozzolan, synergistically interacted to yield hardened cementitious compositions of high strength even though the amount of white cement was reduced by 50% or more.

The blended white cement compositions disclosed herein can be used to replace white Portland cement in any desired application and are particularly well-suited for pre-cast concrete, stucco, glass fiber reinforced concrete (GFRC), and ultrahigh performance concrete (UHPC). In some embodiments, the water to cementitious binder ratio (w/cm) is less than 0.45, or less than 0.43, or less than 0.41, or less than 0.39, or less than 0.37, or less than 0.35, or less than 0.33, or less than 0.31, or less than 0.29. The water to cementitious binder ratio is advantageously determined based on the amount of water relative to the hydraulically reactive binder components in the cementitious mixture.

In order to achieve low w/cm mixes while maintaining flow, it is typically desirable to include superplasticizers, admixtures and other flow aids known in the art of concrete, including pre-cast concrete, GFRC, UHPC, ready mixed concrete, and self-consolidating concrete (SCC). UHPC is itself often designed so as to be self-consolidating. Example admixtures include polycarboxylate ethers known in art, which are preferred over darker colored plasticizers and water reducers, such as lignosulfonates. Latex binders used to bind the cementitious compositions to polymer foam or other non-cementitious structures can sometimes improve the plasticity and flow of cementitious mixtures in addition to their adhesive properties. For example, latex binders based on polyvinyl acetate polymers and co-polymers have been found to further improve flow when used in small amounts in combination with a superplasticizer. A viscosity modifying agent (VMA) can be used to provide cohesiveness and moldability and to prevent bleeding and segregation. Examples include cellulosic ethers known in the art (e.g., Methocel).

Non-reactive components, such as coarse limestone particles coarser than typical cement particles (i.e., particles larger than about 50 µm), can be excluded from the mass balance of cementitious binder when determining the water to cementitious binder ratio (w/cm). Limestone particles smaller than 50 µm may, on the other hand, be counted toward the "cement" content for purposes of determining the w/cm. Limestone particles larger than, e.g., 50 µm are considered to be part of the aggregate content for purposes of determining the w/cm but limestone particles of all sizes may nevertheless be considered to constitute an SCM and form part of the "cement paste" when smaller than about 200 µm. Limestone and other non-reactive SCM particles can be considered to be "paste aggregates" because they are hardly discernable as ordinary aggregates but are intermixed within the cement paste. In the context of the present invention, they have been shown to increase the strength of the cement paste and overall cementitious composition and therefore contribute to cement paste volume and strength. Adding limestone powder can increase the overall powder content, which also reduces the tendency of the cementitious composition to experience bleeding or segregation, improving workability, cohesiveness, finishability, and overall performance.

It is postulated that coarse limestone particles increase the strength of the cement paste by filling a niche and effectively extending the continuity of the particle size distribution (PSD) of hydraulic cement and SCM particles from a maximum of 50 μm, as is typical for Portland cement in general and white Portland cement used in precast, GFRC, UHPC and SCC applications in particular, to a maximum particle size of at least 60 μm, 70 μm, 80 μm, 90 μm, 100 μm, 110 μm, 120 μm, 130 μm, 140 μm, or 150 μm, and up to 200 μm. This broadening of the PSD of the cementitious binder particles, including white Portland cement, GGBFS, and coarse SCM particles, substantially increases the particle packing density of particles in the cement paste from a typical packing density of 50% or less to upwards of 57% or greater, such as at least 58%, 60%, 62%, 65%, 70% or 75%. This, in turn, significantly reduces the amount of inter-particle spacing, which is otherwise occupied by water or air in a freshly mixed cementitious composition. Reducing the amount of inter-particle spacing causes the cement and/or GGBFS particles to be statistically closer together at a given w/cm, flow and/or superplasticizer content. This, in turn, yields denser cement pastes of higher strength compared to cement pastes in the absence of coarse filler particles.

EXAMPLES

The following examples are given by way of illustration to demonstrate that reductions of up to 50% or more of Portland white cement are possible while maintaining or increasing the compressive strength of hardened cementitious compositions made from the inventive compositions. The white cement was obtained from Lehigh cement and reportedly had a Blaine of 417.3 m$^2$/kg, a percent passing at 325 mesh (44 μm) of 96.5% (for an estimated D90 of about 36-39 μm), a brightness (L) of 93.1, and an iron oxide (Fe$_2$O$_3$) content of 0.2%. The GGBFS was obtained from Lehigh cement from a source in Japan and reportedly had Blaine of 550 m$^2$/kg, a percent passing at 21 μm of 91.7%, a percent passing at 18 μm of 87.8% (for an estimated D90 of about 20 μm), an iron oxide (Fe$_2$O$_3$) content of 0.6%, a manganese oxide (MnO) content of 0.1%, and titanium dioxide (TiO$_2$) content of 0.6%. This GGBFS was very light colored, was substantially finer than the white cement, and had a D90 that was nearly half the D90 of the white cement. The whiteness of the GGBFS was estimated by inspection to be between about 70-80 on the brightness scale.

The "fine limestone powder" used in some of the examples had a PSD of approximately 5 μm to 50 μm and was considered to be a "cementitious SCM" and part of the cementitious binder for purposes of determining the w/cm. It had a brightness of about 92%. The "coarse limestone powder" identified in some of the Examples is the same material identified as "fine limestone sand", which reportedly had a brightness of 92% and less than 0.1% iron oxide (Fe$_2$O$_3$). The fine limestone sand reportedly had 96.7% passing at 212 μm, 89.6% passing at 150 μm, 72.5% passing at 106 μm, 52.1% passing at 75 μm. Based on these numbers, it is estimated that the fine limestone sand had approximately 20-25% passing at 50 μm. As such, about 20-25% of the fine limestone sand was deemed to constitute "cementitious SCM particles" for purposes of determining the w/cm of the paste, an estimated 70-75% of the fine limestone sand had particle sizes between 50-150 μm and therefore constituted "cement paste aggregate", and approximately 10% of the fine limestone sand had particle sizes greater than 150 μm and was therefore considered to form part of the non-paste aggregate, together with the coarser sand particles.

Comparative Example 1 (Control)

A standard cementitious mixture used to make precast limestone moldings for commercial sale was made using the following components.
  White Cement 1180.00 g
  Latex adhesive 36.88 g
  Water 424.06 g
  Coarse limestone sand (0.8-2.3 mm) 590.00 g
  Fine limestone sand (<0.21 mm) 313.44 g
  Medium limestone sand (0.15-0.9 mm) 497.81 g
  PVA fiber 6.50 g
  Superplasticizer 2.2 ml
  Viscosity modifying agent 0.2 g The cementitious mixture was prepared using a Hobart mixer approved for preparing mortar used to make 2-inch mortar cubes according to ASTM C109. After mixing the ingredients together (except for PVA fibers) following the procedure specified in ASTM C109, the PVA fibers were mixed at low speed until distributed throughout the cementitious mixture to avoid breaking or fraying the fibers. The flow was estimated to be approximately 100-110 (as would be measured using a standard flow table).

The cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were covered with a thin film of plastic wrap, and moist towels were placed over the plastic wrap to completely cover the tops and sides of the molds and the surface around the molds to prevent evaporation of water from the cube molds during initial setting and curing.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths. The compressive strength of the cementitious mixture was determined to be either (1) the average of the three compressive strength values corresponding to the three cubes tested at each time interval or (2) the average of the top two strength values (throwing out the lowest value as being less representative of the true strength of the cementitious composition).

The compressive strength of the cementitious mixture of Comparative Example 1 and also the compressive strengths of the cementitious mixtures of Examples 2-10 are set forth in Tables 1A and 1B below for comparison. Comparative Example 1 had a target design strength of 8000 psi (55.2 MPa) at 28 days.

Example 2

A cementitious mixture was made using the following components, with the amount of white Portland cement being reduced by 60% compared to Comparative Example 1.

White Cement 472.00 g
Light color GGBFS 472.00 g
Limestone powder 236.00 g
Latex adhesive 36.88 g
Water 424.06 g
Coarse limestone sand 554.60 g
Fine limestone sand 294.63 g
Medium limestone sand 467.94 g
PVA fiber 6.50 g
Superplasticizer 2.2 ml
Viscosity modifying agent 0.2 g The cementitious mixture of Example 2 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of the hardened cementitious composition of Comparative Example 1. This indicates that either a "natural" uncolored precast limestone molding can be made using the cementitious mixture of Example 2 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS, moldings made using the cementitious composition of Example 2 have lower efflorescence compared to Comparative Example 1.

Example 3

A cementitious mixture was made using the following components, with the amount of white Portland cement being reduced by 60% compared to Comparative Example 1.
White Cement 472.00 g
Light color GGBFS 472.00 g
Limestone powder 118.00 g
Fine recycled glass 118.00 g
Latex adhesive 36.88 g
Water 424.06 g
Coarse limestone sand 554.60 g
Fine limestone sand 294.63 g
Medium limestone sand 467.94 g
PVA fiber 6.50 g
Superplasticizer 2.2 ml
Viscosity modifying agent 0.2 g The cementitious mixture of Example 3 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 3 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and pozzolanically reactive recycled glass, moldings made using the cementitious composition of Example 3 have lower efflorescence compared to Comparative Example 1.

Example 4

A cementitious mixture was made using the following components, with the amount of white Portland cement being reduced by 60% compared to Comparative Example 1.
White Cement 472.00 g
Light color GGBFS 472.00 g
Hydrated Lime 23.60 g
Latex adhesive 30.24 g
Water 347.73 g
Coarse limestone powder 106.20 g
Coarse limestone sand 666.70 g
Fine limestone sand 354.18 g
Medium limestone sand 562.53 g
Superplasticizer 2.2 ml
Viscosity modifying agent 0.2 g The cementitious mixture of Example 4 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 4 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 4 have lower efflorescence compared to Comparative Example 1.

Example 5

A cementitious mixture was made using the following components, with the amount of white Portland cement being reduced by 55% compared to Comparative Example 1.
White Cement 531.00 g
Light color GGBFS 531.00 g
Hydrated Lime 11.80 g
Latex adhesive 23.63 g
Water 385.90 g
Coarse limestone powder 95.58 g
Coarse limestone sand 601.80 g
Fine limestone sand 319.71 g
Medium limestone sand 507.77 g
Superplasticizer 4.0 ml
Viscosity modifying agent 0.2 g The cementitious mixture of Example 5 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 5 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 5 have lower efflorescence compared to Comparative Example 1.

Example 6

A cementitious mixture was made using the following components, with the amount of white Portland cement being reduced by 55.45% compared to Comparative Example 1.
   White Cement 525.69 g
   Light color GGBFS 525.69 g
   Hydrated Lime 10.62 g
   Latex adhesive 23.20 g
   Water 383.66 g
   Coarse limestone sand 613.60 g
   Fine limestone sand 354.18 g
   Medium limestone sand 562.53 g
   PVA fiber 6.50 g
   Superplasticizer 2.7 ml
   Viscosity modifying agent 0.1 g The cementitious mixture of Example 6 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 6 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 6 have lower efflorescence compared to Comparative Example 1.

Example 7

A cementitious mixture was made using the following components, with the amount of white Portland cement being reduced by 54.7% compared to Comparative Example 1.
   White Cement 534.22 g
   Light color GGBFS 534.22 g
   Hydrated Lime 5.37 g
   Latex adhesive 30.54 g
   Water 385.90 g
   Coarse limestone sand 637.20 g
   Fine limestone sand 313.44 g
   Medium limestone sand 537.64 g
   PVA fiber 6.50 g
   Superplasticizer 2.7 ml
   Viscosity modifying agent 0.1 g The cementitious mixture of Example 7 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 7 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 7 have lower efflorescence compared to Comparative Example 1.

Example 8

A cementitious mixture was made using the following components, with the amount of white Portland cement being reduced by 55.45% compared to Comparative Example 1.
   White Cement 525.69 g
   Light color GGBFS 525.69 g
   Hydrated Lime 10.62 g
   Latex adhesive 29.87 g
   Water 381.66 g
   Coarse limestone sand 637.20 g
   Fine limestone sand 338.51 g
   Medium limestone sand 537.64 g
   PVA fiber 6.50 g
   Superplasticizer 2.6 ml
   Viscosity modifying agent 0.0 g The cementitious mixture of Example 8 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 8 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 8 have lower efflorescence compared to Comparative Example 1.

Example 9

A cementitious mixture was made using the following components, with the amount of white Portland cement being reduced by 61% compared to Comparative Example 1.

White Cement 460.48 g
Light color GGBFS 460.48 g
Hydrated Lime 25.79 g
Latex adhesive 29.47 g
Water 368.38 g
Coarse limestone sand 552.57 g
Fine limestone sand 515.73 g
Medium limestone sand 552.57 g
PVA fiber 6.50 g
Superplasticizer 3.0 ml
Viscosity modifying agent 0.05 g The cementitious mixture of Example 9 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 9 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 9 have lower efflorescence compared to Comparative Example 1.

Example 10

A cementitious mixture was made using the following components, with the amount of white Portland cement being reduced by 59.54% compared to Comparative Example 1.

White Cement 477.94 g
Light color GGBFS 477.94 g
Hydrated Lime 18.38 g
Latex adhesive 31.25 g
Water 365.44 g
Coarse limestone sand 459.55 g
Fine limestone sand 461.39 g
Medium limestone sand 683.82 g
PVA fiber 6.50 g
Superplasticizer 2.6 ml
Viscosity modifying agent 0.05 g The cementitious mixture of Example 10 was mixed, molded, cured and tested in the same manner as Comparative Example 1. When freshly mixed, the cementitious mixture was slightly less white (i.e., slightly and perceptibly darker) than Comparative Example 1. However, after curing and being permitted to surface dry, the color of the hardened cementitious composition formed from this mixture was virtually indistinguishable from the color of hardened cementitious composition of Comparative Example 1. This indicates that either a "natural" uncolored precast limestone molding can be made using the cementitious mixture of Example 10 or the cementitious mixture can be colored by adding the same, or substantially the same, amount of pigment(s) as would be added to the cementitious mixture of Comparative Example 1 in order to yield a precast limestone molding of a desired color. In addition, because of the reduced quantity of white cement and the inclusion of GGBFS and hydrated lime, moldings made using the cementitious composition of Example 10 have lower efflorescence compared to Comparative Example 1.

Table 1A shows comparative compressive strength data for Examples 1-10 expressed in units of pounds per square inch (psi). Table 1B shows the same comparative compressive strength data as Table 1A expressed in units of megapascals (MPa). The upper number in each table is the average strength of 3 cubes, and the lower number is the average of strength of the 2 strongest cubes.

TABLE 1A

| | Examples | | | | | | | | | |
|---|---|---|---|---|---|---|---|---|---|---|
| Day tested | 1 | 2 | 3 | 4 | 5 | 6 | 7 | 8 | 9 | 10 |
| 3-day (psi) | 6340* | 4685 | 4176 | 5042 | 6473 | 6420 | 5783 | 3843 | 5637 | 7058 |
| | 6415 | 4883 | 4240 | 5132 | 6685 | 6750 | 5875 | 3910 | 5695 | 7247 |
| 7-day (psi) | 7425 | 5960 | 5640 | 7133 | 7708 | 7407 | 8268 | 6713 | 8303 | 8413 |
| | 7488 | 6030 | 5910 | 7255 | 7793 | 7465 | 8383 | 6757 | 8360 | 8475 |
| 28-day (psi) | 8458 | 7353 | 8003 | 7780 | 10000 | 8640 | 8813 | 9913 | 9477 | 9608 |
| | 8660 | 7410 | 8145 | 7925 | 10230 | 8727 | 8935 | 10135 | 9700 | 9677 |

*4 day strength

TABLE 1B

| | Examples | | | | | | | | | |
|---|---|---|---|---|---|---|---|---|---|---|
| Day tested | 1 | 2 | 3 | 4 | 5 | 6 | 7 | 8 | 9 | 10 |
| 3-day (MPa) | 43.7* | 32.3 | 28.8 | 34.8 | 44.6 | 44.3 | 39.9 | 26.5 | 38.9 | 48.7 |
| | 44.2 | 33.7 | 29.2 | 35.4 | 46.1 | 46.5 | 40.5 | 30.0 | 39.3 | 50.0 |
| 7-day (MPa) | 51.2 | 41.1 | 38.9 | 49.2 | 53.1 | 51.1 | 57.0 | 46.3 | 57.2 | 58.0 |
| | 51.6 | 41.6 | 40.7 | 50.0 | 53.7 | 51.5 | 57.8 | 46.6 | 57.6 | 58.4 |
| 28-day (MPa) | 58.3 | 50.7 | 55.2 | 53.6 | 68.9 | 59.6 | 60.8 | 68.3 | 65.3 | 66.2 |
| | 59.7 | 51.1 | 56.2 | 54.6 | 70.5 | 60.2 | 61.6 | 69.9 | 66.9 | 66.7 |

*4-day strength

Comparative Example 11 (Control)

A standard cementitious mixture used to make glass fiber reinforced concrete (GFRC) for commercial sale was made using the following components.
  White Cement 1344.58 g
  Water 366.32 g
  Latex adhesive 32.79 g
  Coarse limestone powder 196.77 g
  Medium silica sand (0.15-0.4 mm) 426.33 g
  Medium-fine silica sand (0.1-0.25 mm) 623.10 g
  Glass fiber 98.38 g
  Superplasticizer 23 ml
  Viscosity modifying agent 1.05 g The cementitious mixture was prepared using a Hobart mixer approved for preparing mortar used to make 2-inch mortar cubes according to ASTM C109. After mixing the ingredients together (except for the glass fibers) following the procedure specified in ASTM C109, the glass fibers were mixed in at low speed until distributed throughout the cementitious mixture to avoid breaking or fraying the fibers. The flow was estimated to be approximately 100-110 (as would be measured using a standard flow table).

The cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were covered with a thin film of plastic wrap, and moist towels were placed over the plastic wrap to completely cover the tops and sides of the molds and the surface around the molds to prevent evaporation of water from the cube molds during initial setting and curing.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths to. The compressive strength of the cementitious mixture was determined to be either (1) the average of the three compressive strength values corresponding to the three cubes tested at each time interval or (2) the average of the top two strength values (throwing out the lowest value as being less representative of the true strength of the cementitious composition).

The compressive strength of the cementitious mixture of Comparative Example 11 and also the compressive strengths of the cementitious mixtures of Examples 12-15 are set forth in Tables 2A and 2B below for comparison. Comparative Example 11 had a target design strength of 8000 psi (55.2 MPa) at 28 days.

Example 12

A cementitious mixture was made using the following components, with the amount of white Portland cement being reduced by 54.2% compared to Comparative Example 1.
  White Cement 615.42 g
  Light color GGBFS 615.42 g
  Hydrated lime 6.19 g
  Water 337.01 g
  Latex adhesive 30.17 g
  Coarse limestone powder 267.60 g
  Medium silica sand (0.15-0.4 mm) 447.65 g
  Medium-fine silica sand (0.1-0.25 mm) 654.25 g
  Glass fiber 98.38 g
  Superplasticizer 23 ml
  Viscosity modifying agent 1.05 g The cementitious mixture of Example 12 was mixed, molded, cured and tested in the same manner as Comparative Example 11. When freshly mixed, the cementitious mixture was slightly less white (i.e., slightly and perceptibly darker) than Comparative Example 11. However, after curing and being permitted to surface dry, the color of the hardened cementitious composition formed from this mixture was virtually indistinguishable from the color of hardened cementitious composition of Comparative Example 11. This indicates that either a "natural" uncolored GFRC molding can be made using the cementitious mixture of Example 12 or the cementitious mixture can be colored by adding the same, or substantially the same, amount of pigment(s) as would be added to the cementitious mixture of Comparative Example 1 in order to yield a GFRC molding of a desired color. In addition, because of the reduced quantity of white cement and the inclusion of GGBFS and hydrated lime, moldings made using the cementitious composition of Example 12 have lower efflorescence compared to Comparative Example 11.

Example 13

A cementitious mixture was made using the following components, with the amount of white Portland cement being reduced by 58.83% compared to Comparative Example 1.
  White Cement 553.56 g
  Light color GGBFS 553.56 g
  Ultrafine pumice (D50=3-4 μm) 123.70 g
  Hydrated lime 6.19 g
  Water 337.01 g
  Latex adhesive 30.17 g
  Coarse limestone powder 240.06 g
  Medium silica sand (0.15-0.4 mm) 447.65 g
  Medium-fine silica sand (0.1-0.25 mm) 654.25 g
  Glass fiber 98.38 g
  Superplasticizer 23 ml
  Viscosity modifying agent 1.05 g The cementitious mixture of Example 13 was mixed, molded, cured and tested in the same manner as Comparative Example 11. When freshly mixed, the cementitious mixture was slightly less white (i.e., slightly and perceptibly darker) than Comparative Example 11. However, after curing and being permitted to surface dry, the color of the hardened cementitious composition formed from this mixture was virtually indistinguishable from the color of hardened cementitious composition of Comparative Example 11. This indicates that either a "natural" uncolored GFRC molding can be made using the cementitious mixture of Example 13 or the cementitious mixture can be colored by adding the same, or substantially the same, amount of pigment(s) as would be added to the cementitious mixture of Comparative Example 11 in order to yield a GFRC molding of a desired color. In addition, because of the reduced quantity of white cement and the inclusion of GGBFS, pumice, and hydrated lime, moldings made using the cementitious composition of Example 13 have lower efflorescence compared to Comparative Example 11.

Example 14

A cementitious mixture was made using the following components, with the amount of white Portland cement being reduced by 58.83% compared to Comparative Example 1.
  White Cement 553.56 g
  Light color GGBFS 553.56 g
  Volcanic Ash-Limestone (D90=56 μm) 123.70 g
  Hydrated lime 6.19 g
  Water 337.01 g
  Latex adhesive 30.17 g
  Coarse limestone powder 242.02 g
  Medium silica sand (0.15-0.4 mm) 447.65 g
  Medium-fine silica sand (0.1-0.25 mm) 654.25 g
  Glass fiber 98.38 g
  Superplasticizer 23 ml
  Viscosity modifying agent 1.05 g The cementitious mixture of Example 14 was mixed, molded, cured and tested in the same manner as Comparative Example 11. When freshly mixed, the cementitious mixture was slightly less white (i.e., slightly and perceptibly darker) than Comparative Example 11. However, after curing and being permitted to surface dry, the color of the hardened cementitious composition formed from this mixture was virtually indistinguishable from the color of hardened cementitious composition of Comparative Example 11. This indicates that either a "natural" uncolored GFRC molding can be made using the cementitious mixture of Example 14 or the cementitious mixture can be colored by adding the same, or substantially the same, amount of pigment(s) as would be added to the cementitious mixture of Comparative Example 11 in order to yield a GFRC molding of a desired color. In addition, because of the reduced quantity of white cement and the inclusion of GGBFS, volcanic ash, and hydrated lime, moldings made using the cementitious composition of Example 14 have lower efflorescence compared to Comparative Example 11.

Example 15

A cementitious mixture was made using the following components, with the amount of white Portland cement being reduced by 58.83% compared to Comparative Example 1.
  White Cement 553.56 g
  Light color GGBFS 553.56 g
  Light color ultrafine fly ash (D90=10 μm) 123.70 g
  Hydrated lime 6.19 g
  Water 337.01 g
  Latex adhesive 30.17 g
  Coarse limestone powder 238.09 g
  Medium silica sand (0.15-0.4 mm) 447.65 g
  Medium-fine silica sand (0.1-0.25 mm) 654.25 g
  Glass fiber 98.38 g
  Superplasticizer 23 ml
  Viscosity modifying agent 1.05 g The cementitious mixture of Example 15 was mixed, molded, cured and tested in the same manner as Comparative Example 11. When freshly mixed, the cementitious mixture was slightly less white (i.e., slightly and perceptibly darker) than Comparative Example 11. However, after curing and being permitted to surface dry, the color of the hardened cementitious composition formed from this mixture was virtually indistinguishable from the color of hardened cementitious composition of Comparative Example 11. This indicates that either a "natural" uncolored GFRC molding can be made using the cementitious mixture of Example 15 or the cementitious mixture can be colored by adding the same, or substantially the same, amount of pigment(s) as would be added to the cementitious mixture of Comparative Example 11 in order to yield a GFRC molding of a desired color. In addition, because of the reduced quantity of white cement and the inclusion of GGBFS, fly ash, and hydrated lime, moldings made using the cementitious composition of Example 15 have lower efflorescence compared to Comparative Example 11.

Table 2A shows comparative compressive strength data for Examples 11-15 expressed in units of pounds per square inch (psi). Table 2B shows the same comparative compressive strength data as Table 1A expressed in units of megapascals (MPa). The upper number in each table is the average strength of 3 cubes, and the lower number is the average of strength of the 2 strongest cubes.

TABLE 2A

| Day | Examples | | | | |
| tested | 11 | 12 | 13 | 14 | 15 |
| --- | --- | --- | --- | --- | --- |
| 3-day (psi) | 7253 7385 | 7337 7338 | 8403 8540 | 6662 6937 | 6125 6285 |
| 7-day (psi) | 8180 8235 | 9342 9665 | 11377 11565 | 11170 11230 | 8017 8225 |
| 28-day (psi) | 9563 9705 | 11607 11755 | 12167 12250 | 12635 12862 | 10790 10960 |

TABLE 2B

| Day | Examples | | | | |
| tested | 11 | 12 | 13 | 14 | 15 |
| --- | --- | --- | --- | --- | --- |
| 3-day (MPa) | 50.0 50.9 | 50.6 50.6 | 57.9 58.9 | 45.9 47.8 | 42.2 43.3 |
| 7-day (MPa) | 56.4 56.8 | 64.4 66.6 | 78.4 79.7 | 77.0 78.1 | 55.3 56.7 |
| 28-day (MPa) | 65.9 66.9 | 80.0 81.0 | 83.4 84.5 | 87.1 88.7 | 74.4 75.6 |

Comparative Example 16 (Control)

A control cementitious mixture comprising white Portland cement and a commercially available silica sand, which is based on a commercially available cementitious mixture used to make precast decorative moldings, was made using the following components.
  White Cement 1180.00 g
  Water 424.06 g
  Medium silica sand (0.5-1.5 mm) 1410.00 g
  Superplasticizer 2.2 ml
  Viscosity modifying agent 0.5 g The cementitious mixture was prepared using a Hobart mixer approved for preparing mortar used to make 2-inch mortar cubes according to ASTM C109. The flow was approximately 140-150 (as would be measured using a standard flow table). The cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were then covered with a thin film of plastic wrap, and moist towels were placed over the plastic wrap to completely cover the tops and sides of the molds and the surface around the molds to prevent evaporation of water from the cube molds.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths. The compressive strength of the cementitious mixture was determined to be either (1) the average of the three compressive strength values corresponding to the three cubes tested at each time interval or (2) the average of the top two strength values (throwing out the lowest value as being less representative of the true strength of the cementitious composition).

The compressive strength of the cementitious mixture of Comparative Example 16 and also the compressive strengths of the cementitious mixtures of Examples 17-32 are set forth in Tables 3A, 3B, 4A and 4B below for comparison. Comparative Example 16 had a design strength of 8000 psi (55.2 MPa) at 28 days.

Example 17

A cementitious mixture was made using the following components, with the amount of white Portland cement being reduced by 60% compared to Comparative Example 16.
  White Cement 472.00 g
  Light color GGBFS 472.00 g
  Limestone powder 212.40 g
  Hydrated lime 23.60 g
  Water 424.06 g
  Medium silica sand 1320.00 g
  Superplasticizer 2.2 ml
  Viscosity modifying agent 0.4 g The cementitious mixture of Example 17 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 17 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and hydrated lime, moldings made using the cementitious composition of Example 17 have lower efflorescence compared to Comparative Example 16.

Example 18

A cementitious mixture was made using the following components, with the amount of white Portland cement being reduced by 65% compared to Comparative Example 1.
  White Cement 413.00 g
  Light color GGBFS 472.00 g
  Ultrafine fly ash 59.00 g
  Limestone powder 212.40 g
  Hydrated lime 23.60 g
  Water 424.06 g
  Medium silica sand 1330.00 g
  Superplasticizer 2.0 ml
  Viscosity modifying agent 0.32 g The cementitious mixture of Example 18 was mixed, molded, cured and tested in the same manner as Comparative Example 16. When freshly mixed, the cementitious mixture was less white (i.e., perceptibly darker) than Comparative Example 16, particular due to the inclusion of fly ash. After curing and being permitted to surface dry, the color of the hardened cementitious composition formed from this mixture was slightly yellowish-green. Depending on the desired color and the color match or contrast between the fly ash and pigments, precast decorative moldings can be colored by adding the same or similar pigment(s) as would be added to the cementitious mixture of Comparative Example 16 in order to yield a precast decorative molding of a desired color. In addition, because of the reduced quantity of white cement and the inclusion of GGBFS, fly ash, and hydrated lime, moldings made using the cementitious composition of Example 18 have lower efflorescence compared to Comparative Example 16.

Example 19

A cementitious mixture was made using the following components, with the amount of white Portland cement being reduced by 65% compared to Comparative Example 1.
  White Cement 413.00 g
  Light color GGBFS 472.00 g
  Fine baghouse glass 59.00 g
  Limestone powder 212.40 g
  Hydrated lime 23.60 g
  Water 424.06 g
  Medium silica sand 1350.00 g
  Superplasticizer 2.0 ml
  Viscosity modifying agent 0.32 g The cementitious mixture of Example 19 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 19 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, glass, and hydrated lime, moldings made using the cementitious composition of Example 19 have lower efflorescence compared to Comparative Example 16.

Example 20

A cementitious mixture was made using the following components, with the amount of white Portland cement being reduced by 55% compared to Comparative Example 1.
White Cement 531.00 g
Light color GGBFS 413.00 g
Limestone powder 230.10 g
Hydrated lime 5.90 g
Water 424.06 g
Medium silica sand 1350.00 g
Superplasticizer 2.0 ml
Viscosity modifying agent 0.2 g
The cementitious mixture of Example 20 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 20 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and hydrated lime, moldings made using the cementitious composition of Example 20 have lower efflorescence compared to Comparative Example 16.

Example 21

A cementitious mixture was made using the following components, with the amount of white Portland cement being reduced by 50% compared to Comparative Example 1.
White Cement 590.00 g
Light color GGBFS 354.00 g
Limestone powder 230.10 g
Hydrated lime 5.90 g
Water 424.06 g
Medium silica sand 1350.00 g
Superplasticizer 2.0 ml
Viscosity modifying agent 0.18 g
The cementitious mixture of Example 21 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 21 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and hydrated lime, moldings made using the cementitious composition of Example 21 have lower efflorescence compared to Comparative Example 16.

Example 22

A cementitious mixture was made using the following components, with the amount of white Portland cement being reduced by 56.8% compared to Comparative Example 1.
White Cement 509.76 g
Light color GGBFS 509.76 g
Limestone powder 254.88 g
Water 420.55 g
Medium silica sand 1250.00 g
Superplasticizer 3.0 ml
Viscosity modifying agent 0.19 g
The cementitious mixture of Example 22 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 22 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, moldings made using the cementitious composition of Example 22 have lower efflorescence compared to Comparative Example 16.

Example 23

A cementitious mixture was made using the following components, with the amount of white Portland cement being reduced by 60% compared to Comparative Example 1.
White Cement 472.00 g
Light color GGBFS 472.00 g
Limestone powder 460.20 g
Water 341.37 g
Medium silica sand 1300.00 g
Superplasticizer 6.0 ml
Viscosity modifying agent 0.5 g
The cementitious mixture of Example 23 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 23 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, moldings made using the cementitious composition of Example 23 have lower efflorescence compared to Comparative Example 16.

Example 24

A cementitious mixture was made using the following components, with the amount of white Portland cement being reduced by 60% compared to Comparative Example 1.

White Cement 472.00 g
Light color GGBFS 472.00 g
Limestone powder 236.00 g
Water 424.06 g Recycled glass 70 mesh minus 236.00 g
Medium silica sand 1090.00 g
Superplasticizer 2.5 ml
Viscosity modifying agent 0.13 g The cementitious mixture of Example 24 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 24 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and recycled glass powder, moldings made using the cementitious composition of Example 24 have lower efflorescence compared to Comparative Example 16.

Example 25

A cementitious mixture was made using the following components, with the amount of white Portland cement being reduced by 60% compared to Comparative Example 1.

White Cement 472.00 g
Light color GGBFS 472.00 g
Limestone powder 224.20 g
Hydrated lime 11.80 g
Water 424.06 g
Recycled glass 70 mesh minus 111.50 g
Medium silica sand 1100.00 g
Superplasticizer 2.5 ml
Viscosity modifying agent 0.13 g The cementitious mixture of Example 25 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 25 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, hydrated lime, and recycled glass powder, moldings made using the cementitious composition of Example 25 have lower efflorescence compared to Comparative Example 16.

Example 26

A cementitious mixture was made using the following components, with the amount of white Portland cement being reduced by 60% compared to Comparative Example 1.

White Cement 472.00 g
Light color GGBFS 472.00 g
Volcanic Ash-limestone (D90=56 μm) 212.40 g
Hydrated lime 23.60 g
Water 424.06 g
Medium silica sand 1320.00 g
Superplasticizer 2.2 ml
Viscosity modifying agent 0.4 g The cementitious mixture of Example 26 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 26 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, hydrated lime, and volcanic ash, moldings made using the cementitious composition of Example 26 have lower efflorescence compared to Comparative Example 16.

Example 27

A cementitious mixture was made using the following components, with the amount of white Portland cement being reduced by 60% compared to Comparative Example 1.

White Cement 472.00 g
Light color GGBFS 472.00 g
Coarse Fly ash (D10=20 μm) 424.80 g
Hydrated lime 23.60 g
Water 347.73 g
Medium silica sand 1250.00 g
Superplasticizer 6.0 ml
Viscosity modifying agent 0.6 g The cementitious mixture of Example 27 was mixed, molded, cured and tested in the same manner as Comparative Example 16. When freshly mixed, the cementitious mixture was less white (i.e., perceptibly darker) than Comparative Example 16, particular due to the inclusion of fly ash. After curing and being permitted to surface dry, the color of the hardened cementitious composition formed from this mixture was slightly brownish-grey. Depending on the desired color and the color match or contrast between the fly ash and pigments, precast decorative moldings can be colored by adding the same or similar pigment(s) as would be added to the cementitious mixture of Comparative Example 16 in order to yield a precast decorative molding of a desired color. In addition, because of the reduced quantity of white cement and the inclusion of GGBFS, fly ash, and hydrated lime, moldings made using the cementitious composition of Example 27 have lower efflorescence compared to Comparative Example 16.

Example 28

A cementitious mixture was made using the following components, with the amount of white Portland cement being reduced by 60% compared to Comparative Example 1.
  White Cement 472.00 g
  Light color GGBFS 472.00 g
  Coarse limestone powder 424.80 g
  Hydrated lime 23.60 g
  Water 347.73 g
  Medium silica sand 1320.00 g
  Superplasticizer 4.0 ml
  Viscosity modifying agent 0.4 g The cementitious mixture of Example 28 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 28 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and hydrated lime, moldings made using the cementitious composition of Example 278 have lower efflorescence compared to Comparative Example 16.

Example 29

A cementitious mixture was made using the following components, with the amount of white Portland cement being reduced by 65% compared to Comparative Example 1.
  White Cement 413.00 g
  Light color GGBFS 472.00 g
  Volcanic Ash-limestone (D90=56 μm) 283.20 g
  Hydrated lime 11.80 g
  Water 424.06 g
  Medium silica sand 1304.00 g
  Superplasticizer 2.0 ml
  Viscosity modifying agent 0.2 g The cementitious mixture of Example 29 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 29 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, hydrated lime, and volcanic ash, moldings made using the cementitious composition of Example 29 have lower efflorescence compared to Comparative Example 16.

Example 30

A cementitious mixture was made using the following components, with the amount of white Portland cement being reduced by 70% compared to Comparative Example 1.
  White Cement 354.00 g
  Light color GGBFS 531.00 g
  Volcanic Ash-limestone (D90=56 μm) 283.20 g
  Hydrated lime 11.80 g
  Water 424.06 g
  Medium silica sand 1304.00 g
  Superplasticizer 2.0 ml
  Viscosity modifying agent 0.2 g The cementitious mixture of Example 30 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 30 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, hydrated lime, and volcanic ash, moldings made using the cementitious composition of Example 30 have lower efflorescence compared to Comparative Example 16.

Example 31

A cementitious mixture was made using the following components, with the amount of white Portland cement being reduced by 55.6% compared to Comparative Example 1.

White Cement 523.92 g
Light color GGBFS 523.92 g
Coarse limestone powder 253.11 g
Hydrated lime 6.55 g
Water 378.92 g
Medium silica sand 1320.00 g
Superplasticizer 2.5 ml
Viscosity modifying agent 0.2 g The cementitious mixture of Example 31 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 31 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS and hydrated lime, moldings made using the cementitious composition of Example 31 have lower efflorescence compared to Comparative Example 16.

Example 32

A cementitious mixture was made using the following components, with the amount of white Portland cement being reduced by 55.6% compared to Comparative Example 1.

White Cement 523.92 g
Light color GGBFS 523.92 g
Volcanic Ash-limestone (D90=56 μm) 246.62 g
Hydrated lime 13.10 g
Water 381.27 g
Medium silica sand 1314.00 g
Superplasticizer 2.8 ml
Viscosity modifying agent 0.2 g The cementitious mixture of Example 32 was mixed, molded, cured and tested in the same manner as Comparative Example 16. When freshly mixed, the cementitious mixture was slightly less white (i.e., slightly and perceptibly darker) than Comparative Example 16. However, after curing and being permitted to surface dry, the color of the hardened cementitious composition formed from this mixture was virtually indistinguishable from the color of hardened cementitious composition of Comparative Example 16. This indicates that either a "natural" uncolored precast decorative molding can be made using the cementitious mixture of Example 32 or the cementitious mixture can be colored by adding the same, or substantially the same, amount of pigment(s) as would be added to the cementitious mixture of Comparative Example 16 in order to yield a precast decorative molding of a desired color. In addition, because of the reduced quantity of white cement and the inclusion of GGBFS, hydrated lime, and volcanic ash, moldings made using the cementitious composition of Example 32 have lower efflorescence compared to Comparative Example 16.

Tables 3A, 3B, 4A and 4B show comparative compressive strength data for Examples 16-25 and Examples 16 and 26-32, respectively, in units of pounds per square inch (psi) and megapascals (MPa). The upper number is the average strength of 3 cubes, and the lower number is the average of strength of the 2 strongest cubes.

TABLE 3A

| Day tested | Examples | | | | | | | | | |
|---|---|---|---|---|---|---|---|---|---|---|
| | 16 | 17 | 18 | 19 | 20 | 21 | 22 | 23 | 24 | 25 |
| 3-day (psi) | 5737 | 4887 | 4688 | 3520 | 4613 | 4708 | 5650 | 6600 | 3127 | 3858 |
| | 5900 | 5260 | 4762 | 3545 | 4755 | 4923 | 5740 | 6930 | 3235 | 3867 |
| 7-day (psi) | 6847 | 7233 | 6208 | 6461 | 5991 | 6462 | 7060 | 8136 | 4110 | 5240 |
| | 7010 | 7375 | 6625 | 6692 | 6147 | 6645 | 7215 | 8315 | 4260 | 5355 |
| 28-day (psi) | 8313 | 9282 | 8325 | 9047 | 7792 | 8023 | 8150 | 10227 | 5027 | 6850 |
| | 8380 | 9400 | 8463 | 9105 | 7830 | 8140 | 8230 | 10325 | 5140 | 6910 |

TABLE 3B

| Day tested | Examples | | | | | | | | | |
|---|---|---|---|---|---|---|---|---|---|---|
| | 16 | 17 | 18 | 19 | 20 | 21 | 22 | 23 | 24 | 25 |
| 3-day (MPa) | 39.6 | 33.7 | 32.3 | 24.3 | 31.8 | 32.5 | 39.0 | 45.5 | 21.6 | 26.6 |
| | 40.7 | 36.3 | 32.8 | 24.4 | 32.8 | 33.9 | 39.6 | 47.8 | 22.3 | 26.7 |
| 7-day (MPa) | 47.2 | 49.9 | 42.8 | 44.6 | 41.3 | 44.6 | 48.7 | 56.1 | 28.3 | 36.1 |
| | 48.3 | 50.8 | 45.7 | 46.1 | 42.4 | 45.8 | 49.7 | 57.3 | 29.4 | 36.9 |
| 28-day (MPa) | 57.3 | 64.0 | 57.4 | 62.4 | 53.7 | 55.3 | 56.2 | 70.5 | 34.7 | 47.2 |
| | 57.8 | 64.8 | 58.4 | 62.8 | 54.0 | 56.1 | 56.7 | 71.2 | 35.4 | 47.6 |

TABLE 4A

| Day tested | Examples | | | | | | | |
|---|---|---|---|---|---|---|---|---|
| | 26 | 26 | 27 | 28 | 29 | 30 | 31 | 32 |
| 3-day (psi) | 5737 | 6670 | 3837 | 5053 | 5028 | 4820 | 6708 | 6720 |
| | 5900 | 6770 | 3955 | 5165 | 5133 | 4960 | 6788 | 6870 |
| 7-day (psi) | 6847 | 8743 | 7330 | 7023 | 5778 | 5240 | 8522 | 8623 |
| | 7010 | 8775 | 7670 | 7140 | 5903 | 5345 | 8630 | 8685 |
| 28-day (psi) | 8313 | 9667 | 8910 | 8502 | 7493 | 7123 | 9812 | 10587 |
| | 8380 | 9735 | 9025 | 8585 | 7520 | 7293 | 9997 | 10670 |

TABLE 4B

| Day tested | Examples | | | | | | | |
|---|---|---|---|---|---|---|---|---|
| | 26 | 26 | 27 | 28 | 29 | 30 | 31 | 32 |
| 3-day (MPa) | 39.6 | 46.0 | 26.5 | 34.8 | 34.7 | 33.2 | 46.3 | 46.3 |
| | 40.7 | 46.7 | 27.3 | 35.6 | 35.4 | 34.2 | 46.8 | 47.4 |
| 7-day (MPa) | 47.2 | 60.3 | 50.5 | 48.4 | 39.9 | 36.1 | 58.8 | 59.5 |
| | 48.3 | 60.5 | 52.9 | 49.2 | 40.7 | 36.9 | 59.5 | 59.9 |
| 28-day (MPa) | 57.3 | 66.7 | 61.4 | 58.6 | 51.7 | 49.1 | 67.7 | 73.0 |
| | 57.8 | 67.1 | 62.2 | 59.2 | 51.8 | 50.3 | 68.9 | 73.6 |

The invention claimed is:

1. A cementitious composition comprising a dry blend of:
   white Portland cement having a Blaine fineness between about 350 m$^2$/kg and about 550 m$^2$/kg, a D90 between about 11 µm and about 50 µm, and a total combined iron oxide, manganese oxide, and chromium oxide content of less than 1.0% by weight;
   a ground granulated blast furnace slag (GGBFS) having a Blaine fineness greater than the Blaine fineness of the white Portland cement, a D90 less than the D90 of the white Portland cement, and a total combined iron oxide, manganese oxide, and chromium oxide content of less than 2.0% by weight; and
   optionally one or more additional components.

2. The cementitious composition of claim 1, wherein the Blaine fineness of the white Portland cement is between about 400 m$^2$/kg and about 550 m$^2$/kg.

3. The cementitious composition of claim 1, wherein the D90 of the white Portland cement is between about 12 µm and about 45 µm.

4. The cementitious composition of claim 1, wherein the Blaine fineness of the ground granulated blast furnace slag is between about 425 m$^2$/kg and about 700 m$^2$/kg.

5. The cementitious composition of claim 1, wherein the D90 of the GGBFS is between about 7 µm and about 40 µm.

6. The cementitious composition of claim 1, wherein the white Portland cement has a total combined transition metal oxide content of less than 1.0% by weight.

7. The cementitious composition of claim 1, wherein the GGBFS has a total combined transition metal oxide content of less than 2.0% by weight.

8. The cementitious composition of claim 1, wherein the white Portland cement comprises between about 20% and about 80% by combined weight of the white Portland cement and the GGBFS.

9. The cementitious composition of claim 1, wherein the white Portland cement has a reflectance value of at least 75%.

10. The blended cement composition of claim 9, wherein the GGBFS has a reflectance value that is less than the reflectance value of the white Portland cement, and wherein the reflectance value of the GGBFS is at least 70%.

11. The cementitious composition of claim 1, further comprising an additional supplementary cementitious material (SCM), the additional SCM having a total combined transition metal oxide content of less than 3.0% by weight.

12. The cementitious composition of claim 11, wherein the additional SCM is selected from the group consisting of natural pozzolan, ground pumice, metakaolin, ground limestone, ground marble, calcium carbonate, precipitated calcium carbonate, calcined clay, calcined shale, industrial ash, ground glass, and mixtures thereof.

13. The cementitious composition of claim 1, further comprising at least one additive selected from the group consisting of lime (CaO), dolomite lime (CaO.MgO), hydrated lime (Ca(OH)$_2$), hydrated dolomite lime (Ca(OH)$_2$.Mg(OH)$_2$), calcium sulfate hemihydrate (CaSO$_4$.½H$_2$O), anhydrous calcium sulfate (CaSO$_4$), calcium sulfate dihydrate (CaSO$_4$.2H$_2$O), and mixtures thereof.

14. The cementitious composition of claim 1, further comprising at least one aggregate selected from the group consisting of fine sand, medium sand, coarse sand, pea gravel, coarse aggregate, and mixtures thereof.

15. The cementitious composition of claim 14, wherein the at least one aggregate is selected from the group consisting of limestone, marble, dolomite, marble, quartz, quartzite, pumice, polymers, and mixtures thereof.

16. The cementitious composition of claim 1, further comprising fibers selected from the group consisting of glass fibers, polypropylene fibers, polyvinyl alcohol fibers, nylon fibers, and mixtures thereof.

17. A cementitious mixture comprising mixture products of:
   water; and
   the cementitious composition of claim 1.

18. The cementitious mixture of claim 17, wherein the cementitious mixture is selected from precast concrete, stucco, glass fiber reinforced concrete (GFRC), ultra-high performance concrete (UHPC), or self-consolidating concrete (SCC).

19. A hardened cementitious composition comprising reaction products of the cementitious mixture of claim 17.

20. A method of manufacturing a cementitious composition comprising:
   providing white Portland cement prepared by grinding white cement clinker in a mill together with gypsum to produce the white Portland cement having a Blaine fineness between about 350 m$^2$/kg and about 550 m$^2$/kg, a D90 between about 11 µm and about 50 µm, and a total combined iron oxide, manganese oxide, and chromium oxide content of less than 1.0% by weight;
   providing a ground granulated blast furnace slag (GGBFS) prepared by separately grinding granulated blast furnace slag in a mill, and without intergrinding with the white Portland cement, to produce GGBFS having a Blaine fineness greater than the Blaine fineness of the white Portland cement, a D90 less than the D90 of the white Portland cement, and a total combined iron oxide, manganese oxide, and chromium oxide content of less than 2.0% by weight; and
   blending the white Portland cement and the GGBFS and optionally one or more additional components.

21. The method of claim 20, further comprising blending the white Portland cement and the GGBFS with water and at least one supplementary cementitious material (SCM) selected from the group consisting of natural pozzolan, ground pumice, metakaolin, ground limestone, ground marble, calcium carbonate, precipitated calcium carbonate, calcined clay, calcined shale, industrial ash, ground glass, and mixtures thereof.

22. The method of claim 20, further comprising blending the white Portland cement and the GGBFS with at least one additive selected from the group consisting of lime (CaO), dolomite lime (CaO.MgO), hydrated lime (Ca(OH)$_2$), hydrated dolomite lime (Ca(OH)$_2$.Mg(OH)$_2$), calcium sulfate hemihydrate (CaSO$_4$.½H$_2$O), anhydrous calcium sulfate (CaSO$_4$), and calcium sulfate dihydrate (CaSO$_4$.2H$_2$O).

23. A cementitious composition comprising mixture products of:
   white Portland cement having a Blaine fineness between about 350 m$^2$/kg and about 550 m$^2$/kg, a D90 between about 12 µm and about 45 µm, and a total combined iron oxide, manganese oxide, and chromium oxide content of less than 1.0% by weight;

a ground granulated blast furnace slag (GGBFS) having a Blaine fineness greater than the Blaine fineness of the white Portland cement and that is between about 425 m²/kg and about 700 m²/kg, a D90 less than the D90 of the white Portland cement and that is between about 7 μm and about 40, and a total combined iron oxide, manganese oxide, and chromium oxide content of less than 2.0% by weight; and at least one supplementary cementitious material (SCM) selected from the group consisting of natural pozzolan, ground pumice, metakaolin, ground limestone, ground marble, calcium carbonate, precipitated calcium carbonate, calcined clay, calcined shale, industrial ash, ground glass, and mixtures thereof.

24. A cementitious composition comprising mixture products of:

white Portland cement having a Blaine fineness between about 350 m²/kg and about 550 m²/kg, a D90 between about 12 μm and about 45 μm, and a total combined iron oxide, manganese oxide, and chromium oxide content of less than 1.0% by weight;

a ground granulated blast furnace slag (GGBFS) having a Blaine fineness greater than the Blaine fineness of the white Portland cement and that is between about 425 m²/kg and about 700 m²/kg, a D90 less than the D90 of the white Portland cement and that is between about 7 μm and about 40, and a total combined iron oxide, manganese oxide, and chromium oxide content of less than 2.0% by weight; and at least one additive selected from the group consisting of lime (CaO), dolomite lime (CaO.MgO), hydrated lime (Ca(OH)$_2$), hydrated dolomite lime (Ca(OH)$_2$.Mg(OH)$_2$), calcium sulfate hemihydrate (CaSO$_4$.½H$_2$O), anhydrous calcium sulfate (CaSO$_4$), calcium sulfate dihydrate (CaSO$_4$.2H$_2$O), and mixtures thereof.

* * * * *